N. L. BALLANCE.
VEHICLE AXLE.
APPLICATION FILED FEB. 24, 1910.
983,112.
Patented Jan. 31, 1911.
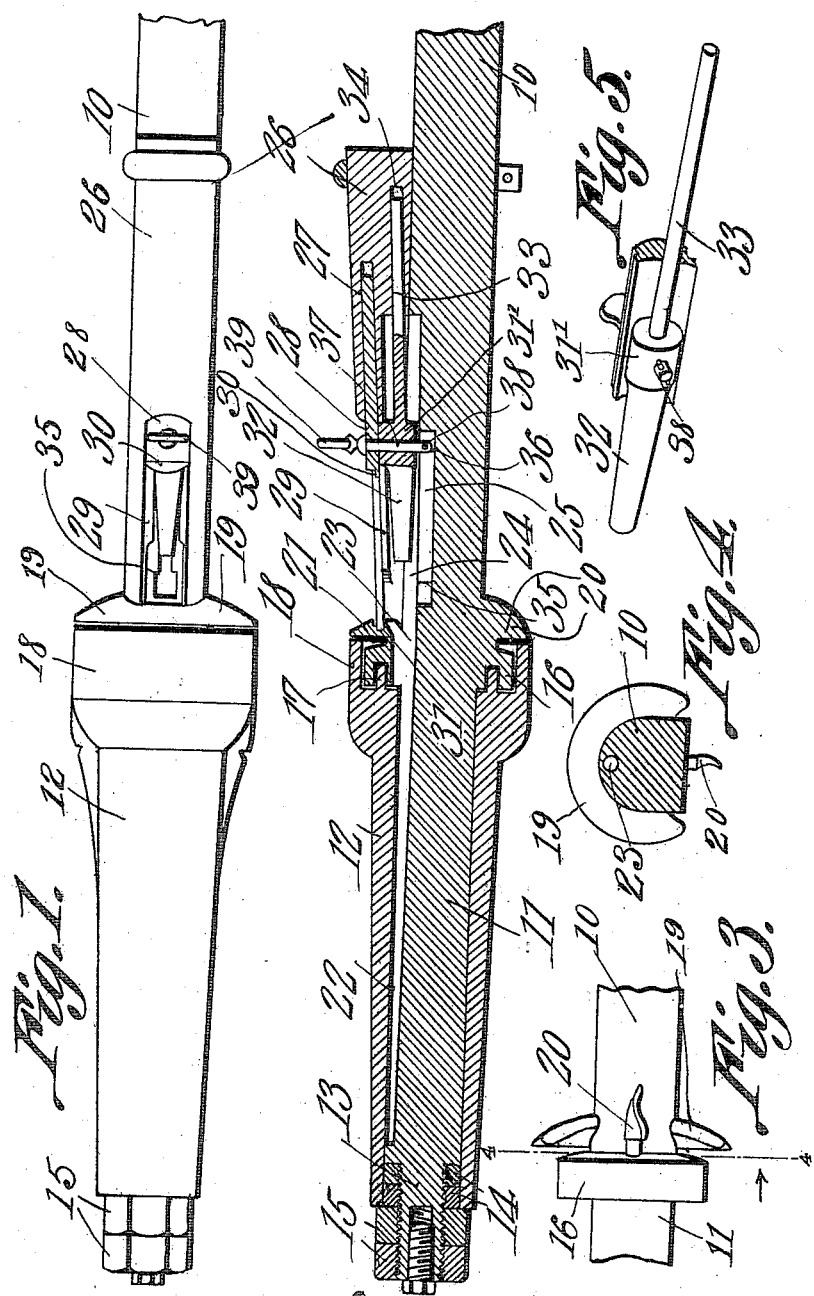
Inventor
Norman L. Ballance.
Witnesses

UNITED STATES PATENT OFFICE.

NORMAN L. BALLANCE, OF PAMLICO, NORTH CAROLINA.

VEHICLE-AXLE.

983,112. Specification of Letters Patent. Patented Jan. 31, 1911.

Application filed February 24, 1910. Serial No. 545,585.

*To all whom it may concern:*

Be it known that I, NORMAN L. BALLANCE, a citizen of the United States, residing at Pamlico, in the county of Pamlico and State of North Carolina, have invented a new and useful Vehicle-Axle, of which the following is a specification.

It is the object of the present invention to provide an improved construction of vehicle axle and the invention aims, more specifically, to provide, in a vehicle axle of that class in which a groove is formed in the spindle to contain oil or grease for lubricating said spindle and the axle-box therefor, means for closing the entrance to this groove and preventing leakage of the lubricant.

The invention aims further to so construct the axle and the axle-box upon the spindle thereof that the entrance of dust and grit between the spindle and the axle-box will be obviated.

In the ordinary construction of vehicle-axles, the lubricant will gradually work its way from between the spindle and the axle-box and will accumulate around the inner end of the wheel hub, and the present invention therefore has as a further aim, the provision of means for preventing such accumulation of the waste lubricant.

In the accompanying drawings,—Figure 1 is a view in top plan of a vehicle axle constructed in accordance with the present invention. Fig. 2 is a longitudinal sectional view therethrough. Fig. 3 is a bottom plan view of a portion of the spindle. Fig. 4 is a vertical sectional view on the line 4—4 of Fig. 3 looking in the direction indicated by the arrow, and Fig. 5 is a perspective view in detail of a portion of the device for closing the entrance to the lubricating groove of the spindle.

In the drawings, the axle is indicated by the numeral 10 and is provided with the usual spindle 11 upon which is fitted an axle box 12. At its outer end, the spindle 11 is reduced and threaded, as at 13, and fitted upon its said reduced portion are two or more washers 14, the said washers being threaded onto the said portion in superposed relation. Two or more nuts 15 are also threaded upon the said portion 13 in superposed relation not only with respect to each other but also with respect to the washers 14. The inner one of the washers 14 rests against the shoulder which is afforded by forming the reduced portion 13 of the spindle, whereas the inner one of the nuts 15 engages with the outer end of the axle-box 12. At its inner end, the spindle is formed with an annular flange 16 presented toward the outer end of the said spindle and at its inner end, the axle-box 12 is formed with concentric annular flanges 17 and 18, of which flanges the one 17 fits within the flange 16, whereas the one 18 fits over or receives the said flange 16. In other words, the flanges 17 and 18 and the flange 16 interfit. By so forming the spindle and axle-box, the discharge of lubricant is materially checked and the entrance of dust and grit between the spindle and box is practically entirely prevented. The axle-box is further formed, directly inwardly of the flange 16, with a flange 19 which extends around the said spindle except at the under side where the said spindle is formed with a fin or blade 20 located between the ends of the rib 19. This fin depends and is concaved or grooved in its forward face so that any of the lubricant which may find its way past the flanges 16, 17 and 18, will be allowed to flow down in the space 21 afforded between the flange 16 and the flange 19 and, coming in contact with the fin 20, will be accumulated at one point only, and inasmuch as this fin is concaved and is tapered toward its lower extremity, the accumulated lubricant will be allowed to drip from the fin to the ground.

In order that lubricant may be supplied to the spindle and axle-box, the said spindle is formed in its upper side with a groove 22 which extends nearly the entire length of the said spindle and is connected, by an opening 23 with the continuation 24 in the upper side of the axle 10. In the bottom of the continuation 24 of the groove 22, there is formed a groove 25. A block 26 is disposed upon the upper side of the axle and extends part way over the said continuation 24, as is clearly shown in Fig. 2 of the drawings. This block 26 is formed with a recess 27 which opens through that end which is presented toward the outer end of the axle and fitted for sliding movement in this recess is a plate, which is indicated by the numeral 28. The edges of this plate 28 are seated in rabbets 29 formed in the side walls of the extension 24 of the groove 22 and the plate at its outer end is formed with a tongue 30 adapted to fit in a recess or seat 31 when the plate is slid to position to close the said groove 24, it being understood that it is in open position in Figs. 1 and 2 of the drawings. Upon the under side of the plate 28 at its outer end, there is secured a head 31′. Projecting axially from the head 31′ is a tapered plug 32 which, when the blade 28 is in position to close the groove 24, fits exactly within the opening 23 and prevents the discharge, by way of the said opening, of any lubricant which has been introduced into the groove 22. A stem 33 projects also axially from the head and extends in a direction opposite to the direction of extent of the plug 32 and this said stem 33 fits in a bore 34 formed in the block 26. The groove 25 is widened thus forming shoulders 35 and 36, and a pin 37 is mounted to turn in the head 31′, and at its lower end is provided with oppositely projecting studs 38 which are adapted to engage with either the shoulders 35 or the shoulders 36 when the plate 28 is slid to closed or open position respectively, and the said pin 37 is rotated to bring the studs transversely of the groove. In order that the pin 37 may be readily turned so as to hold the plate in closed or open position, it is formed or provided at its upper end with a finger piece 39 which may also be grasped for the purpose of sliding the said plate.

What is claimed is:

1. An axle having its spindle formed with a groove and with a flange having an opening communicating with the groove at one end thereof, the axle being formed with a recess in communication with the said opening, a closure for the recess, a plug carried by the closure and adapted to fit into and close said opening when the closure is in position to close the recess, and means for holding the closure in closed position, the said means comprising a pin rotatably mounted in the plug and having projections adapted to engage shoulders in the walls of the recess.

2. An axle formed with a flange extending partway therearound, an axle-box fitted upon the spindle, the inner end of the said axle-box abutting against the flange, the said spindle being formed with an oil groove and the axle being formed between the ends of the flange with a pin.

3. An axle formed with a flange extending partway therearound, an axle-box fitted upon the spindle, the inner end of the said axle-box abutting against the flange, the said spindle being formed with an oil groove and the axle being formed between the ends of the flange with a fin projecting downwardly and tapered toward its lower extremity.

4. An axle formed with a flange extending partway therearound, an axle-box fitted upon the spindle, the inner end of the said axle-box abutting against the flange, the said spindle being formed with an oil groove and the axle being formed between the ends of the flange with a fin projecting downwardly and tapered toward its lower extremity, the said fin having a forwardly presented concave face.

In testimony that I claim the foregoing as my own, I have hereto affixed my signature in the presence of two witnesses.

NORMAN L. BALLANCE.

Witnesses:
W. J. SMITH, Jr.,
H. W. McDIARMIDL.